United States Patent
Sander et al.

(10) Patent No.: US 9,645,854 B2
(45) Date of Patent: May 9, 2017

(54) DYNAMIC WORK PARTITIONING ON HETEROGENEOUS PROCESSING DEVICES

(75) Inventors: Benjamin Thomas Sander, Austin, TX (US); Michael Houston, Cupertino, CA (US); Newton Cheung, San Jose, CA (US); Keith Lowery, Bothell, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 708 days.

(21) Appl. No.: 13/287,418

(22) Filed: Nov. 2, 2011

(65) Prior Publication Data

US 2012/0192201 A1  Jul. 26, 2012

Related U.S. Application Data (60) Provisional application No. 61/423,465, filed on Dec. 15, 2010.

(51) Int. Cl.
*G06F 9/50* (2006.01)
*G06T 1/20* (2006.01)

(52) U.S. Cl.
CPC .............. *G06F 9/5044* (2013.01); *G06T 1/20* (2013.01)

(58) Field of Classification Search
CPC .......... G06F 9/5044; G06F 9/505; G06T 1/20
See application file for complete search history.

(56) References Cited

U.S. PATENT DOCUMENTS

| | | | |
|---|---|---|---|
| 5,826,081 A * | 10/1998 | Zolnowsky | 718/103 |
| 7,015,915 B1 * | 3/2006 | Diard | 345/522 |
| 7,159,221 B1 | 1/2007 | Willen et al. | |
| 7,898,545 B1 * | 3/2011 | Alben et al. | 345/519 |
| 8,286,196 B2 | 10/2012 | Munshi et al. | |
| 2002/0138637 A1 * | 9/2002 | Suzuoki | G06F 9/4862 709/230 |
| 2005/0125793 A1 * | 6/2005 | Aguilar | G06F 9/4843 718/100 |
| 2007/0074207 A1 | 3/2007 | Bates et al. | |
| 2009/0002380 A1 * | 1/2009 | Langyel | G06T 15/005 345/522 |

(Continued)

FOREIGN PATENT DOCUMENTS

| | | |
|---|---|---|
| CN | 101706741 | 5/2010 |
| JP | 2003167726 A | 6/2003 |

OTHER PUBLICATIONS

International Search Report and Written Opinion for International Application No. PCT/US2011/064172, United States Patent and Trademark Office, United States, mailed on Apr. 26, 2012.

(Continued)

*Primary Examiner* — Abdullah Al Kawsar
(74) *Attorney, Agent, or Firm* — Volpe and Koenig, P.C.

(57) ABSTRACT

A method, system and article of manufacture for balancing a workload on heterogeneous processing devices. The method comprising accessing a memory storage of a processor of one type by a dequeuing entity associated with a processor of a different type, identifying a task from a plurality of tasks within the memory that can be processed by the processor of the different type, synchronizing a plurality of dequeuing entities capable of accessing the memory storage, and dequeuing the task form the memory storage.

22 Claims, 8 Drawing Sheets

(56) References Cited

U.S. PATENT DOCUMENTS

2011/0161975 A1* 6/2011 Alexander et al. .......... 718/104

OTHER PUBLICATIONS

Chen et al., "Dynamic Load Balancing on Single- and Multi-GPU Systems." [online] in Proc. of the IEEE International Parallel & Distributed Processing Symposium (IPDPS 2010), Atlanta, Georgia, Apr. 19-23, 2010. [retrieved on Mar. 25, 2010]. Retrieved from the Internet <URL: http://www.capsl.udel.edu/pub/doc/papers/LongChen-IPDPS2010.pdf> (entire document, especially p. 1, col. 2; p. 2, col. 2; p. 3, col. 2; p. 4, col. 1; p. 6, col. 2).

Zhao et al., "An architecture design of GPU-accelerated VoD streaming servers with network coding." [online] Collaborative Computing: Networking, Applications and Worksharing (CollaborateCom), 2010 6$^{th}$ International Conference. Oct. 9-10, 2010 [retrieved on Mar. 25, 2012]. Retrieved from the Internet <URL: http://ieeexplore.ieee.org/xpllfreeabs_all.jsp?amumber=5767035> p. 5, col. 1 to col. 2.

* cited by examiner

DYNAMIC WORK PARTITIONING ON HETEROGENEOUS PROCESSING DEVICES

CROSS REFERENCE TO RELATED APPLICATIONS

This application claims the benefit of U.S. Provisional Application No. 61/423,465, filed on Dec. 15, 2010 and is incorporated by reference in its entirety.

BACKGROUND OF THE INVENTION

Field of the Invention

The present invention is generally directed to computer systems. More particularly, the present invention is directed to an architecture for unifying the computational components within a computer system.

Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to 2D and 3D graphics and a few leading edge multimedia applications, which are already accustomed to dealing with graphics and video application programming interfaces(APIs).

With the advent of multi-vendor supported OpenCL™ and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Although a CPU and a GPU traditionally performed different tasks, many types of workloads may be performed using a CPU or a GPU. When either CPU or GPU is free, the computing environment benefits if a workload can be redistributed between the processors.

Prior to processing, a workload is divided into many discrete tasks. Each task is assigned to a work queue associated with either a CPU or a GPU. Conventional computing environments, which include CPUs and GPUs, do not allow work redistribution to a processing device of a different type once a task is assigned to a CPU or a GPU for processing. Conventional systems allow CPUs to redistribute tasks to other CPUs, whereas the GPU does not have the functionality to redistribute work. This also hampers processing because CPUs may be busy while GPUs are free, and vice versa. The unbalanced processing results in inefficiencies and sub-optimal performance, particularly when a task can be processed on either processing device.

SUMMARY OF EMBODIMENTS

Therefore, what are needed are systems and methods where CPUs and GPUs are able to redistribute and balance tasks between themselves.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the invention, in certain circumstances, include a method, system, and article of manufacture for balancing a workload on heterogeneous processing devices. The method comprises accessing a memory storage of a processor of one type by a dequeuing entity associated with a processor of a different type, identifying a task from a plurality of tasks within the memory that can be processed by the processor of the different type, synchronizing a plurality of dequeuing entities capable of accessing the memory storage, and dequeuing the task faun the memory storage Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The present invention will be described with reference to the accompanying drawings. Generally, the drawing in which an element first appears is typically indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
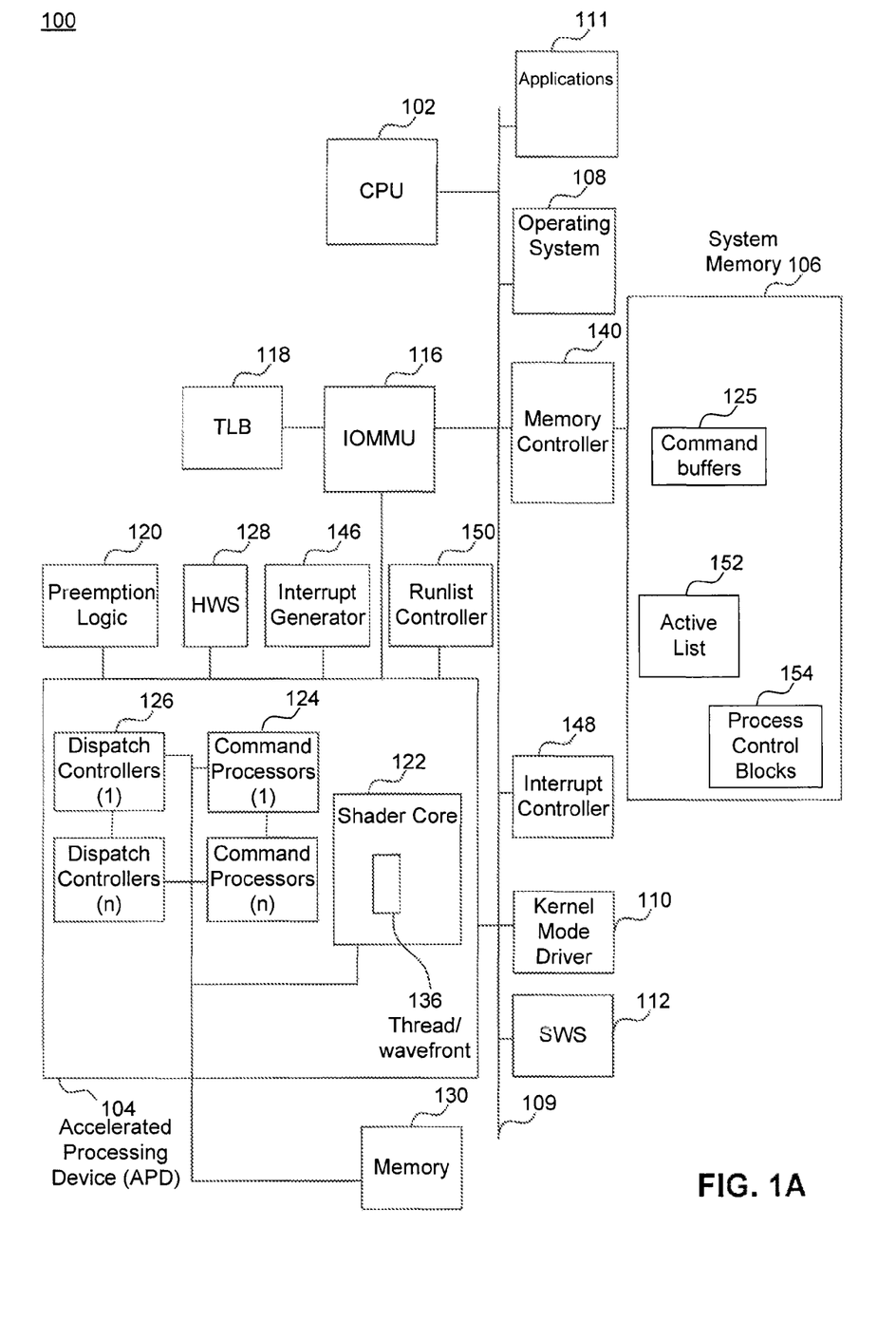
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on APD. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on an APD compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, KMD 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
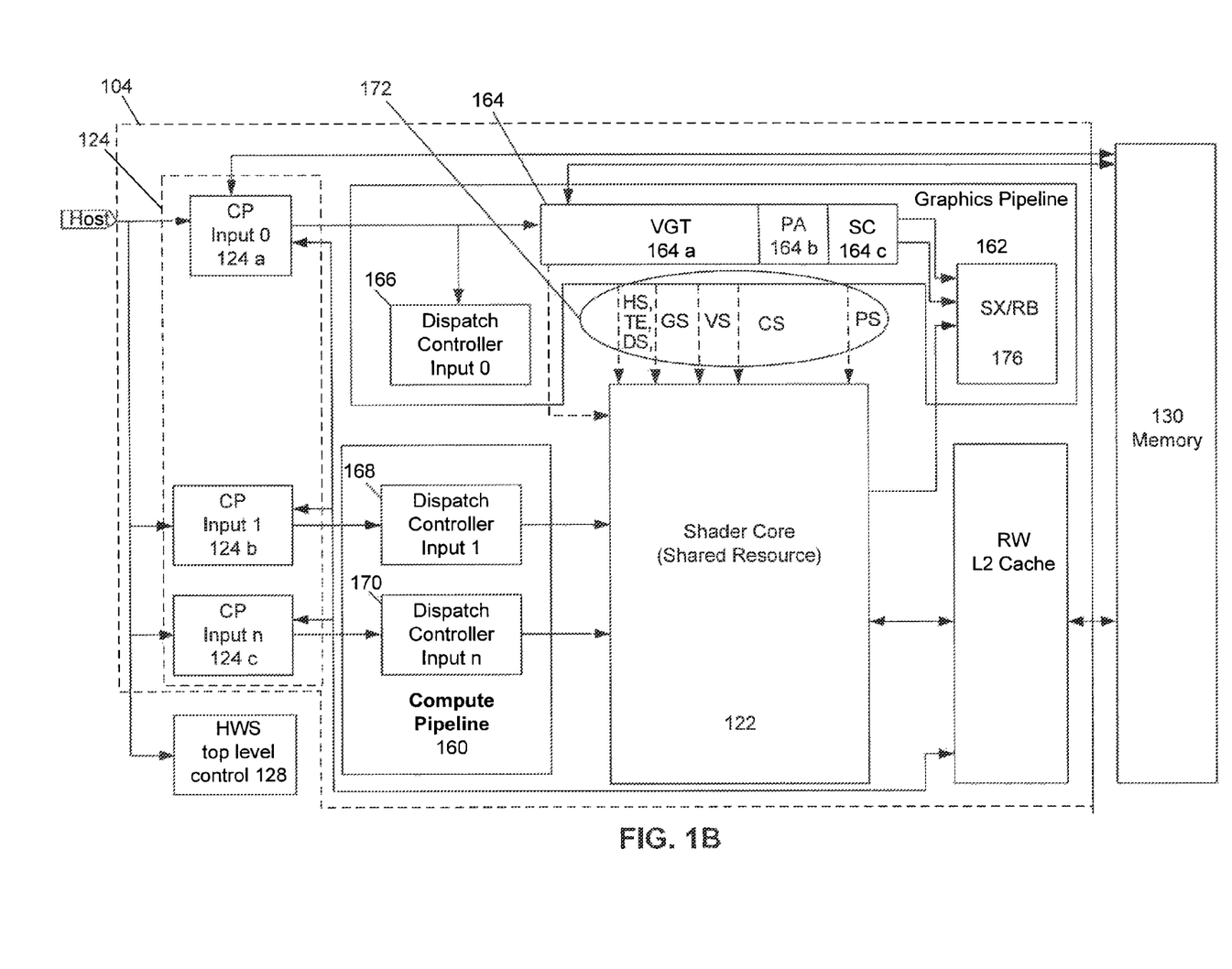
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline.

Other implementations can be used that would also be within the spirit and scope of the present invention. Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data.

Figure 2:
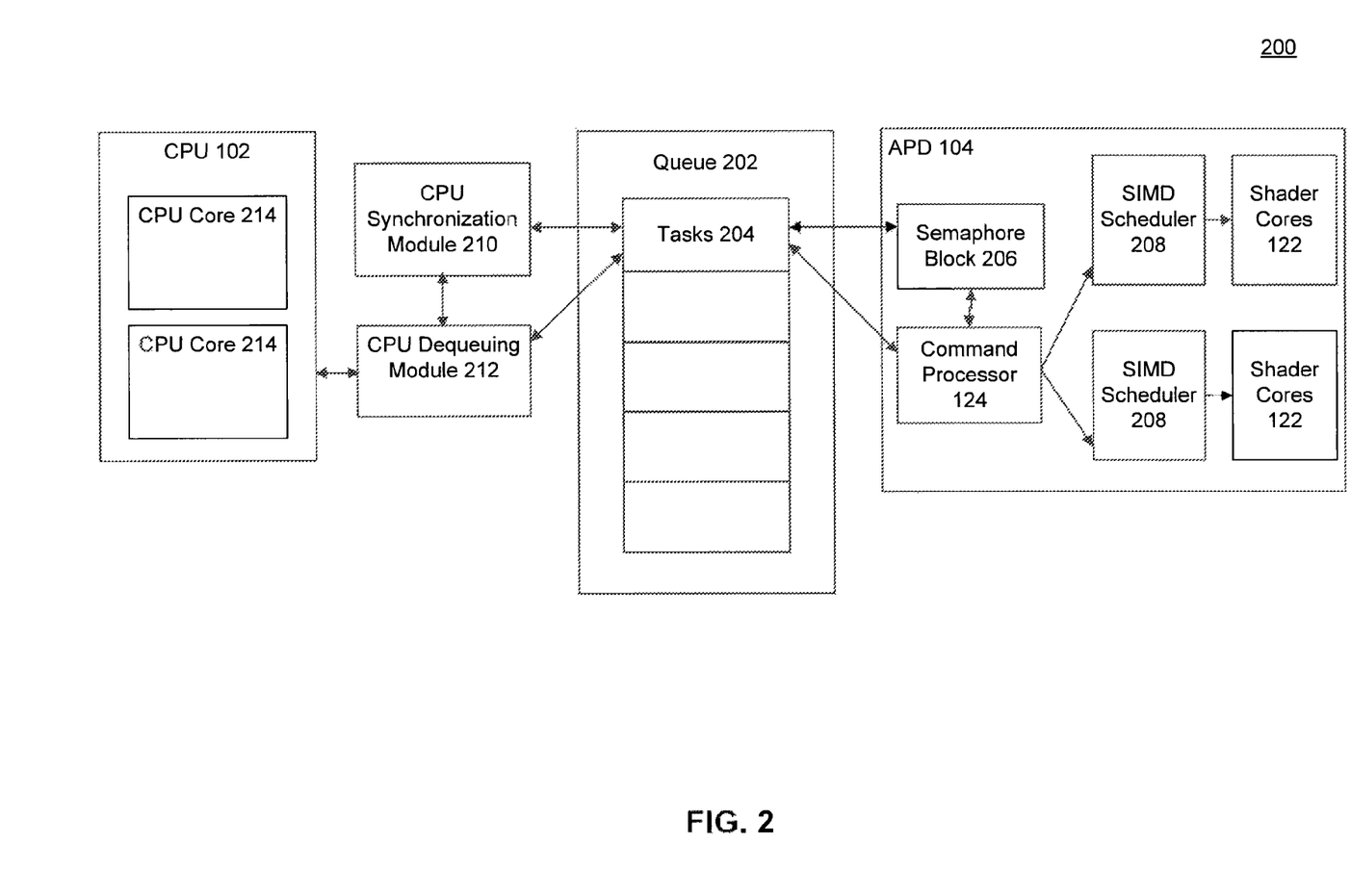
FIG. 2, is an illustrative block diagram of a queuing system where CPU and APD are fused on the same piece of silicon.

FIG. 2 is an illustrative block diagram of a queuing system 200 where a workload is balanced and redistributed for processing on CPU and APD processing devices. Queuing system 200 comprises a queue 202, tasks 204, a semaphore block 206, CP 124 (described herein), one or more SIMD schedulers, 208, shader cores 122, a CPU synchronization module 210, CPU dequeuing module 212 and CPU cores 214.

CPU 102 includes one or more CPU cores 214 as described herein. Each CPU core 214 processes computer instructions and data in CPU 102.

Queue 202 is a segment of memory allocated from system memory 106. A queue operates according to the first-in, first-out ("FIFO"), principle. Namely, the workload that is first enqueued onto a queue is the workload that is first dequeued from a queue, Additionally, a person skilled in the art will appreciate that a discussion of a particular queue data structure is given by way of example and not limitation and that other memory storing data structures for may be used.

Queue 202 is a public queue. A public queue is accessible to processing devices such as CPU 102 and APD 104. Queue 202 stores multiple tasks 204 that are enqueued and dequeued onto queue 202 according to the FIFO principle. Tasks 204 are independent jobs, which include operating system instructions, applications instructions, images and data scheduled for processing on APD 104 or CPU 102. A job is divided into tasks 204 according to a "grain", where a grain represents a size of task 204. The size of the grain varies for tasks 204 scheduled for APD 104 and CPU 102 processors. For example, the size of the grain for tasks 204 processed on CPU 102 is generally smaller than the size of the grain for tasks 204 processed on APD 104.

Tasks 204 include a data structure which holds information instructions and/or pointers to data which requires processing. For example, the data structure holding information for task 204 can be defined as MyTask structure. In a non-limiting example, MyTask structure can include the following parameters:

```
struct MyTask {
    MyPtr myCodePtr
        myCPUCodePtr : pointer to code (x86 binary format)
        myAPDCodePtr :
            //Pointer to code (shader binary format)
    MyPtr myDataPtr :
        myExecRange:
            //Global grid dimensions
            //Local grid dimensions
        myArgSize
        myArgs {(variable size)}
    MyNotification
        //Pointer to notification mechanism
```

```
    MyAffinity
        //processing preference
}
```

MyTask structure includes pointers to the compiled CPU code and APD microcode stored in system memory 106 or another memory device. In the example above, MyPtr myCodePtr defines pointers to microcode executed on CP 124 as myAPDCodePtr and to compiled source code executed on CPU 102 as myCPUCodePtr. myAPDCodePtr points to microcode that includes a function that shader cores 122 use to execute data in task 204. For example, if task 204 is executed on APD 104, APD 104 accesses a function whose address is stored in myAPDCodePtr. If task 204 is exectued on CPU 102, CPU 102 accesses a function whose address is stored in myCPUCodePtr. In an embodiment, myCodePtr can also point to an intermediate language representation that includes dependency information that becomes executable after an occurrence of a predetermined event.

In the example above, the MyTask structure can include a MyPtr myDataPtr. The myDataPtr is a pointer to a location of data in system memory 106 that task 204 requires to process. Also, myDataPtr includes parameters that include information associated with data in task 204. For example, a parameter myArgs includes a list of arguments, myArgSize includes the number of arguments, and myExecRange includes dimensions of the data grid.

In embodiments of the present invention, MyTask structure also includes a MyAffinity parameter. The value of MyAffinity determines the processing device that executes task 204. For example, the value of MyAffinity parameter can indicate a preference, a requirement, a hint, etc. for a processing device such as CPU 102 or APD 104.

A person skilled in the art will appreciate that a data structure, such as MyTask can include other parameters as well.

CPU dequeuing module 212 and CP 124 function as dequeuing entities. Dequeuing entities dequeue or remove tasks from queue 202 for processing on processing devices.

CPU dequeuing module 212 is a software module that accesses queue 202 and removes tasks 204 for processing on CPU 102. In an embodiment, CPU dequeuing module 212 removes tasks from queue 202 associated with APD 104 when CPU 102 requires tasks 204 to process. For example, when queue 202 associated with CPU 102 is empty, but queue 202 associated with APD 104 stores tasks 204 that require processing.

Typically, CPU dequeuing, module 212 retrieves tasks 204 using a FIFO principle. Prior to removing task(s) 204, CPU dequeuing module 212 accesses MyAffinity parameter to determine whether task 204 is suitable for processing on CPU 102. For example, CPU dequeuing module 212 dequeues task(s) 204 where MyAffinity parameter is not set to processing on APD 104 as a requirement. In another example, CPU dequeuing module 212 dequeues task(s) 204 where MyAffinity parameter is not set to processing on APD 104 as a preference. Typically, task(s) 204 that include mathematically complex operations that can be executed by parallel processors can have MyAffinity parameter set to APD 104 processing as a preference or a requirement.

In a multi CPU core 214 environment, CPU dequeuing module 212 corresponds to a particular CPU core 214.

CP 124 accesses queue 202 and removes tasks 204 for processing on APD 104. CP 124 is a hardware module that removes tasks 204 from queue 202 for processing on APD 104. Similarly to CPU dequeuing module 212, CP 124 can remove tasks 204 from queue 202 associated with CPU 102 when queue 202 associated with APD 104 is empty, but queue 202 associated with CPU 102 stores tasks 204 that require processing.

CP 124 retrieves tasks 204 according to FIFO principle. Prior to removing task(s) 204, CP 124 uses MyAffinity parameter to determine whether task 204 is suitable for processing on APD 104. For example, CP 124 dequeues task(s) 204 where MyAffinity parameter is not set to processing on CPU 102 as a requirement. In another example, CP 124 dequeues task(s) 204 where MyAffinity parameter is not set to processing on CPU 102 as a preference. Typically, task(s) 204 that include branch-like code can have MyAffinity parameter set to CPU 102 processing as a preference or a requirement.

After CP 124 removes tasks 204, it forwards task 204 to one or more shader pipe interpolators (SPIs) 208. SPI 208 prepares tasks 204 for processing on shader cores 122. In an embodiment, SPI 208 determines the number of working items and shader cores 122 that are required to process task 204.

Before CPU dequeuing module 212 and CP 124 remove tasks 204 from queue 202, they are synchronized. Synchronization ensures continuous and exclusive access to queue 202 when tasks 204 are removed. CPU synchronization module 210 synchronizes CPU dequeuing module 212 with queue 202 and APD 104 before CPU dequeuing module 212 removes tasks 204 from queue 202. CPU synchronization module 210 guarantees that CPU dequeuing module 212 has sole access to queue 202 when it attempts to remove tasks 204 for processing on CPU 102.

CPU synchronization module 210 uses an atomic operation to ensure CPU dequeuing module 212 has exclusive access to queue 202. A person skilled in the art will appreciate that an atomic operation prevents a process or a hardware device from reading from or writing to a memory location until another process or a hardware device accessing the memory location completes the access.

Prior to removing tasks 204 for processing on APD 104, semaphore block 206 synchronizes CP 124 with queue 202 and CPU 102. Semaphore block 206, also guarantees exclusive access to queue 202 for CP 124. In one embodiment, semaphore block 206 uses an atomic operation to ensure CP 124 has an exclusive access to queue 202. In another embodiment, semaphore block 206 uses event notification mechanism to guarantee exclusive access to queue 202. A person skilled in the art will appreciate that an event notification mechanism notifies a process or a hardware device that a particular memory location is being accessed by another process or a hardware device.

APD 104 and CPU 102 retrieve a different number of tasks 204 from queue 202. A person skilled in the art will appreciate that APD 104 retrieves more tasks 204 because APD 104 is capable of processing more tasks 204 in parallel. As a result, when CP 124 and CPU dequeuing module 212 retrieve tasks 204 from queue 202, the number of tasks 204 each dequeuing device removes from queue 202 depends on whether APD 104 or CPU 102 requested processing.

Figure 3:
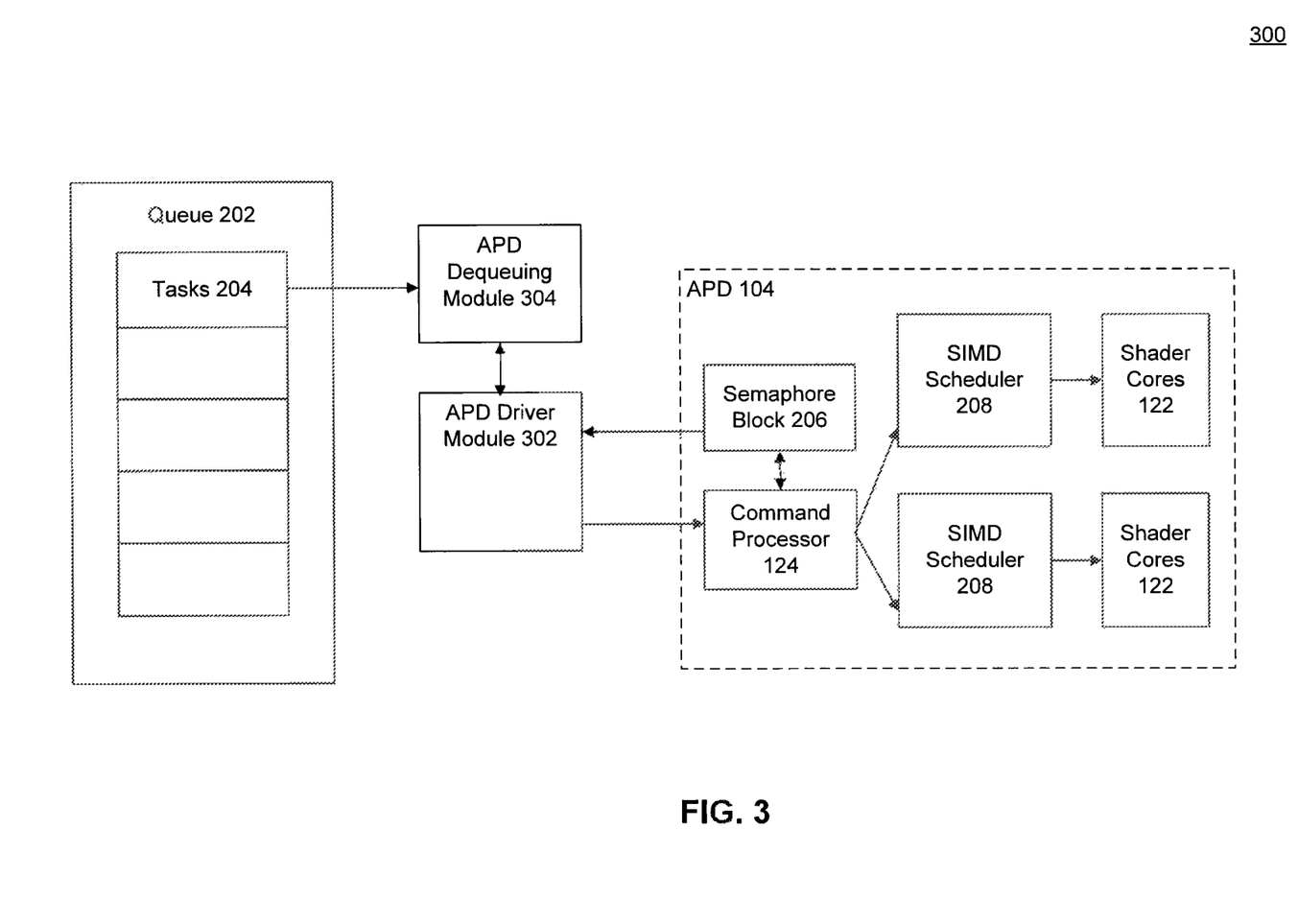
FIG. 3, is an illustrative block diagram of a queuing system in a discrete system environment.

In a discrete processor environment, semaphore block 216 may not be able to directly synchronize queue 202 and requires additional components. FIG. 3, is a block diagram of a queuing system for redistributing workload in a discrete processing environment. In addition to components described herein, in a discrete system environment APD 104 includes an APD driver module 302 and an APD dequeuing module 304 to dequeue tasks 204 from queue 202. APD driver module 302 is a software module that controls the overall execution on APD 104. APD dequeuing module 302 is a software-based module which retrieves tasks 204 from queue 202.

When APD 104 requests work, semaphore block 206 communicates with APD driver module 302. APD driver module 302 communicates with the APD dequeuing module 304. APD dequeuing module 304 removes tasks 204 from queue 202 and submits tasks 204 to CP 124.

Figure 4:
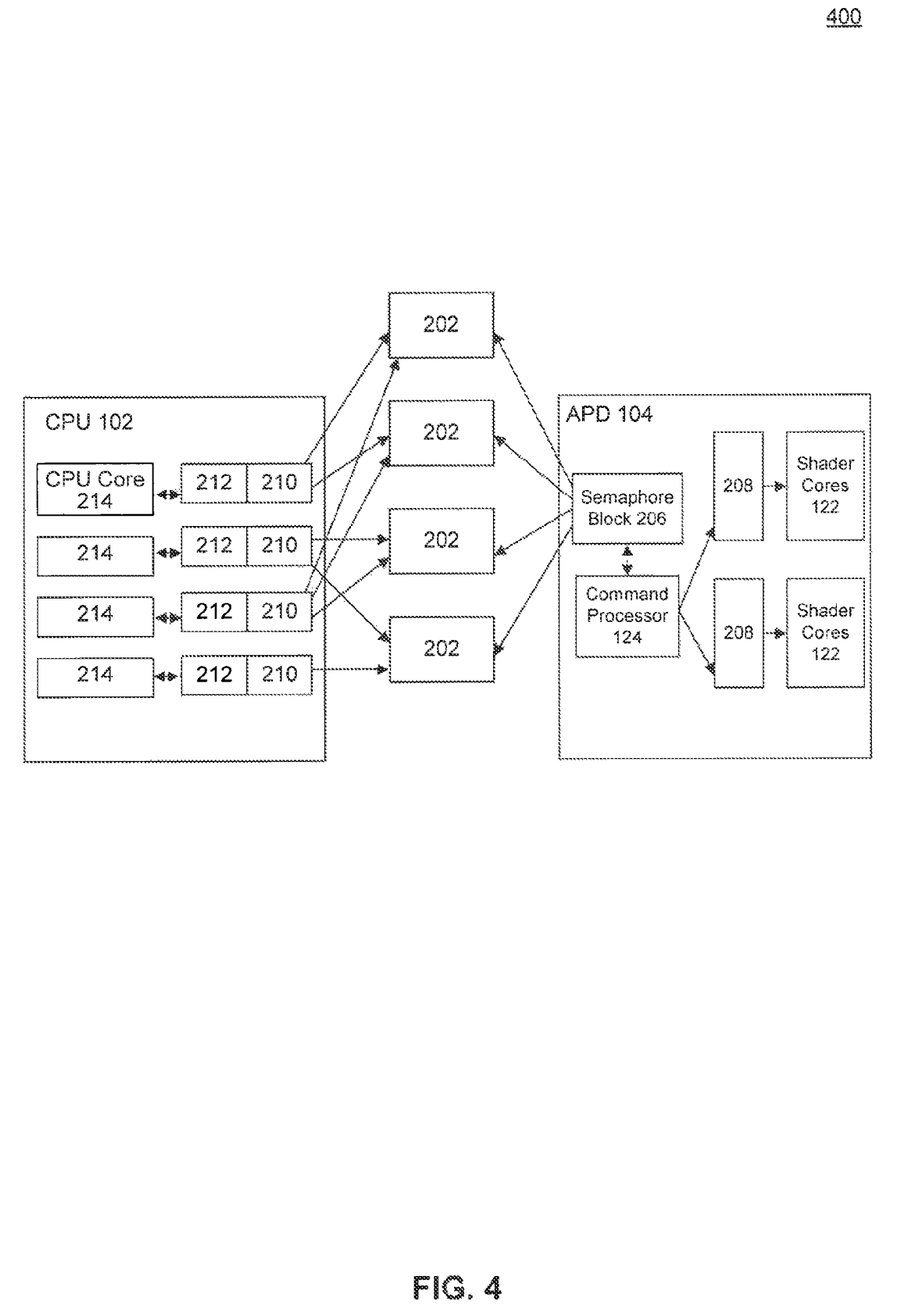
FIG. 4, is an illustrative block diagram of multiple queues balancing tasks for multiple CPUs and APDs.

FIG. 4 is a block diagram of an operating environment 400 which includes multiple queues 202 communicating with CPUs 102 and APDs 104.

Although, each queue 202 can communicate with multiple CPUs 102 and APD 104, queue 202 can primarily store tasks for a particular CPU 102, a particular CPU core 214 or a particular APD 104.

CP 124 can remove tasks 204 from multiple queues 202 associated with CPU 102 and forward tasks 204 to APD 104 for processing as described herein. Similarly, CPU dequeuing module 212 can remove tasks 204 from multiple queues 202 associated with APD 104 for processing on CPU 102 as described herein.

Figure 5:
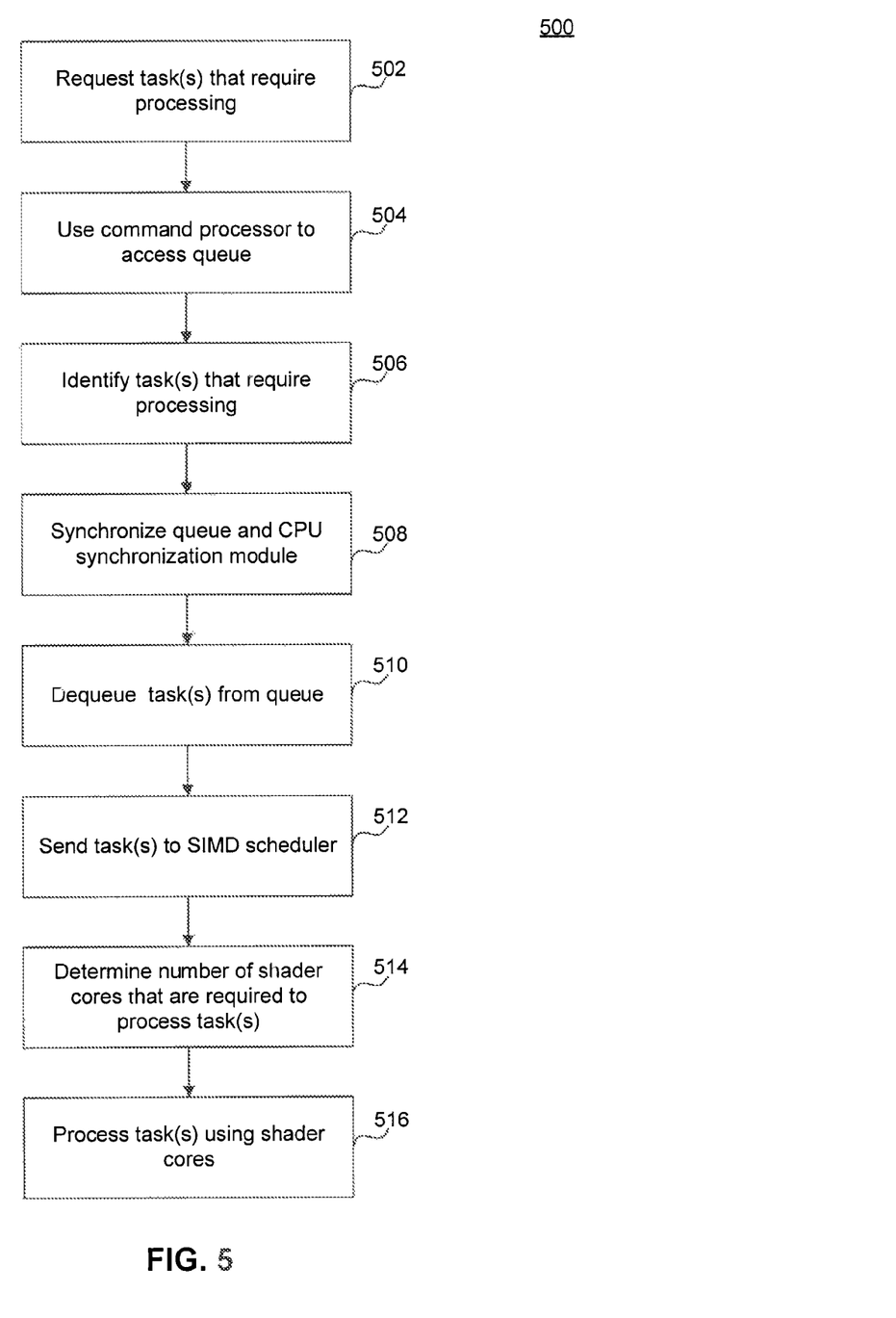
FIG. 5, is an illustrative flowchart of an APD dequeuing tasks from a queue storing tasks for processing on a CPU in a fusion environment.

FIG. 5 is a flowchart 500 of an exemplary embodiment of CP 124 removing tasks 204 from queue 202.

At operation 502, APD 104 requests tasks 204 that require processing.

At operation 504, CP 124 accesses queue 202.

At operation 506, CP 124 identifies task(s) 204 that require processing and can be processed on APD 104. For example, CP 124 identifies the value of MyAffinity parameter in task(s) 204. In an embodiment, CP 124 identifies MyAffinity parameter in tasks 204 that are scheduled to be dequeued from queue 202. If CP 124 identifies tasks(s) 204, the flowchart proceeds to operation 508. Otherwise, flowchart 500 ends.

At operation 508, semaphore block 206 synchronizes queue 202 and CPU synchronization module 210.

At operation 510, CP 124 dequeues task(s) 204 from queue 202.

At operation 512, CP 124 sends task(s) 204 to SPI 208.

At operation 514, SPI 208 determines the resources required for processing task(s) 204 on shader cores 122.

At operation 516, tasks 204 are processed on shader cores 122.

Figure 6:
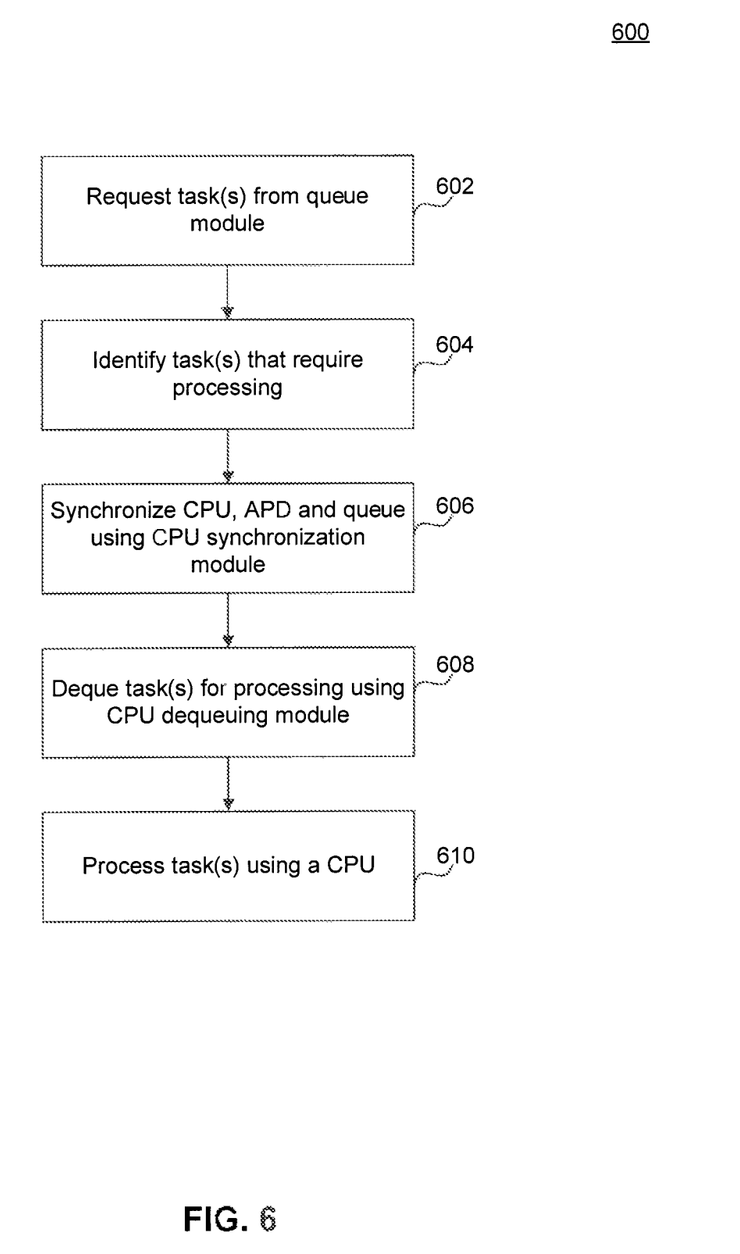
FIG. 6, is an illustrative flowchart of a CPU dequeuing tasks from a queue storing tasks for processing on an APD.

FIG. 6 is a flowchart 600 of an exemplary embodiment of APD dequeuing module 210 removing tasks 204 from queue 202.

At operation 602, CPU 102 requests task(s) 204 from queue 202.

At operation 604, CPU dequeuing module 212 identifies task(s) 204 that require processing and can be processed on CPU 102. For example, CP 124 identifies the value in MyAffinity parameter in task(s) 204. In an embodiment, CP 124 identifies MyAffinity parameter in task(s) 204 that are scheduled to be dequeued from queue 202. If CPU dequeuing module 212 identifies tasks(s) 204, the flowchart proceeds to operation 606. Otherwise, the flowchart ends.

At operation 606, CPU synchronization module 212 synchronizes queue 202 and APD 104, so that only CPU dequeuing module 212 has access to queue 202.

At operation 608, CPU dequeuing module 212 removes tasks 204 from queue 202 as described herein and sends tasks 204 for processing on CPU 102.

At operation 610, CPU 102 processes tasks 204.

Figure 7:
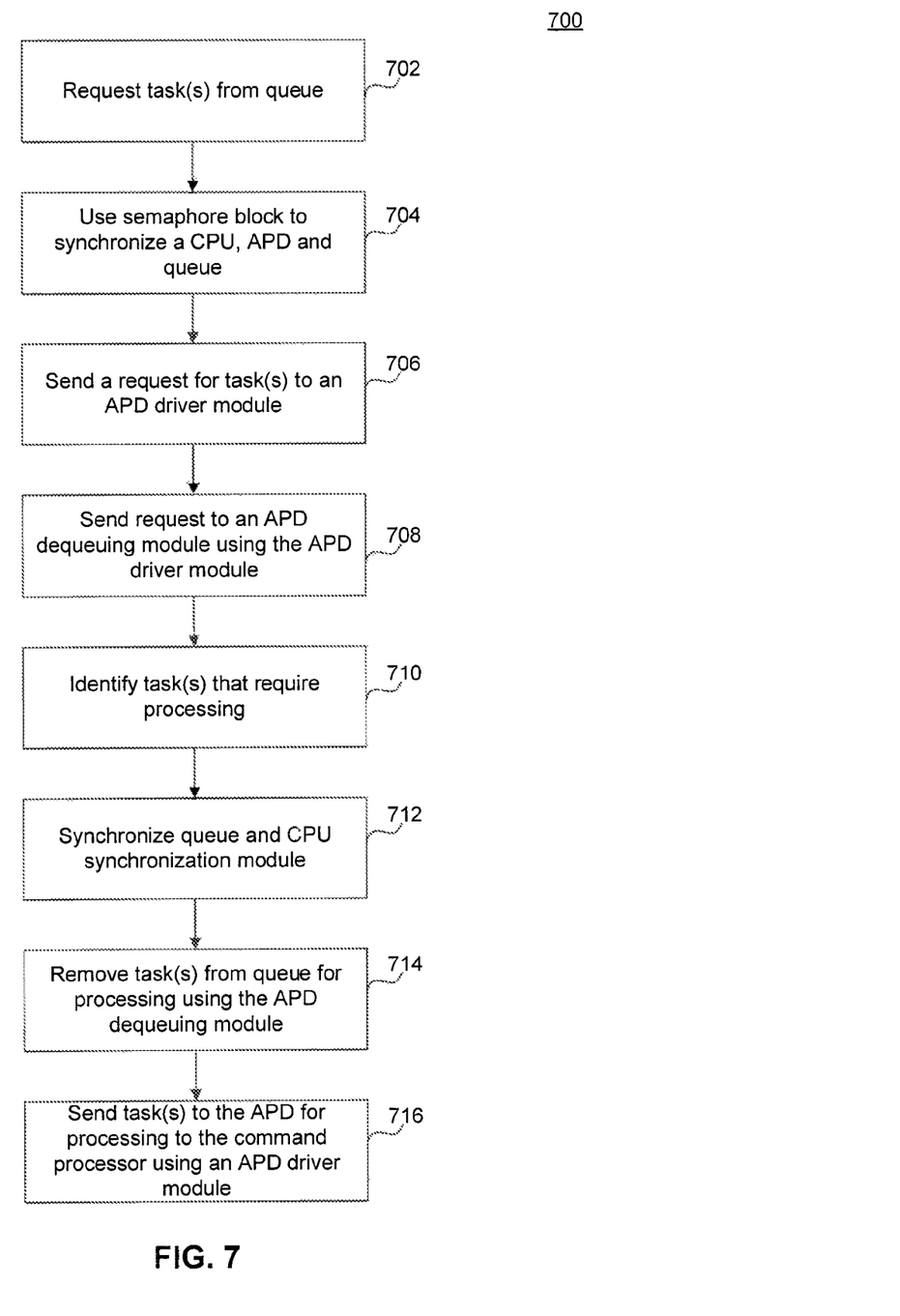
FIG. 7, is an illustrative flowchart of a CPU dequeuing tasks from a queue storing tasks processing on a CPU in a discrete environment.

FIG. 7 is a flowchart 700 of an exemplary embodiment of APD dequeuing module 304 removing tasks 204 from queue 202 for processing on APD 104 in a discrete environment.

At operation 702, APD 104 requests task(s) 204 that require processing as described in operation 502.

At operation 706, APD 104 sends a request for task(s) 204 to APD driver module 302.

At operation 708, APD driver module 302 sends the request to APD dequeuing module 304.

At operation 710, APD dequeuing module 304 identifies task(s) that require processing and can be processed on APD 104 as described in operation 506.

At operation 712, semaphore block 206 synchronizes queue 202 and CPU synchronization module 210 as described in operation 508.

At operation 714, APD dequeuing module 304 dequeues tasks 204 for processing on APD 104 as described in operation 510 and send tasks 204 to APD driver module 302.

At operation 716, APD driver module 302 sends tasks 204 to APD 104, where tasks 204 are processed as described in operations 508-512.

Various aspects of the present invention can be implemented by software, firmware, hardware, or a combination thereof. For example, the methods illustrated by flowcharts 500 of FIG. 5, 600 of FIG. 6, 700 of FIG. 7 can be implemented in unified computing system 100 of FIG. 1. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be memory semiconductors (e.g., DRAMs, etc.). These computer program products are means for providing software to unified computing system 100.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for balancing a workload on heterogeneous processing devices, comprising:
storing a plurality of tasks in a shared queue that is communicatively connected to one or more first processors of a first type and one or more second processors of a second type, wherein each of the plurality of tasks include a first pointer to microcode for execution on the one or more first processors and a second pointer to compiled code for execution on the one or more second processors,
wherein each of the one or more first processors include:
a first dequeuing module, and
one or more first processing cores;
wherein each of the one or more second processors include:
a synchronization module,
a second dequeuing module, and
one or more second processing cores;
synchronizing, by at least one synchronization module of the one or more second processors, access to the shared queue by the first dequeuing module of each of the one or more first processors and the second dequeuing module of each of the one or more second processors utilizing an atomic operation for synchronization;
reading, by at least one second dequeuing module of the one or more second processors, a particular task from among the plurality of tasks;
dequeuing, by the at least one second dequeuing module of the one or more second processors, the particular task from the shared queue on a condition that the particular task is suitable for execution on the one or more second processors;
instructing, by the at least one second dequeuing module of the one or more second processors, the one or more second processing cores to execute the compiled code pointed to by the second pointer, wherein the second pointer is a pointer of the particular task.

2. The method of claim 1, wherein the one or more second processors include a central processing unit (CPU) and the one or more first processors include an accelerated processing device (APD).

3. The method of claim 2, wherein the first dequeuing modules of the one or more first processors are hardware devices.

4. The method of claim 2, wherein the second dequeuing modules of the one or more second processors are software modules.

5. The method of claim 1, wherein the particular task is determined to be suitable for execution on the one or more second processors based on a task parameter stored in the shared queue.

6. The method of claim 1, wherein a number of tasks the second dequeuing modules of the one or more second processors dequeue is based on the type of the one or more second processors.

7. The method of claim 1, further comprising:
reading, by at least one first dequeing module of the one or more first processors, another particular task from among the plurality of tasking,
dequeuing, by the at least one first dequeing modules, the another particular task from the shared queue on a condition that the another particular task is suitable for execution on the one or more first processors,
instructing, by the at least one first dequeing modules, the one or more first processing cores to execute the microcode pointed to by the first pointer.

8. The method of claim 1, wherein each of the plurality of tasks further include a third pointer to an intermediate language representation that includes dependency information that becomes executable after an occurrence of a predetermined event.

9. A system for balancing a workload on heterogeneous processing devices, the system comprising:
one or more first processors of a first type;
one or more second processors of a second type; and
a shared queue communicatively coupled to the one or more first processors and the one or more second processors;
wherein each of the one or more first processors include:
a first dequeuing module, and
one or more first processing cores;
wherein each of the one or more second processors include:
a synchronization module,
a second dequeuing module, and
one or more second processing cores;
wherein the shared queue stores a plurality of tasks, wherein each of the plurality of tasks include a first pointer to microcode for execution on the one or more first processors and a second pointer to compiled code for execution on the one or more second processors;
wherein each synchronization module of the one or more second processors synchronize access to the shared queue by the first dequeuing module of each of the one or more first processors and the second dequeuing module of each of the one or more second processors, utilizing an atomic operation for synchronization prior to removing a particular task from the shared queue, and
wherein each second dequeuing module of the one or more second processors
read the particular task from among the plurality of tasks,
dequeues the particular task from the shared queue on a condition that the particular task is suitable for execution on the one or more second processors,
instruct the one or more second processing cores to execute the compiled code pointed to by the second pointer, wherein the second pointer is a pointer of the particular task.

10. The system of claim 9, wherein one or more second processors include a central processing unit (CPU) and the one or more first processors include an accelerated processing device (APD).

11. The system of claim 9, wherein the first dequeuing modules of the one or more first processors are hardware devices.

12. The system of claim 9, wherein the particular task is determined to be suitable for execution on the one or more second processors based on a task parameter stored in the shared queue.

13. The system of claim 9, wherein a number of tasks the at least one second dequeuing module dequeues is based on the type of the one or more second processors.

14. The system of claim 9, wherein each first dequeuing module of the one or more first processors:

reads another particular task from among the plurality of tasks, dequeues the another particular task from the shared queue on a condition that the another particular task is suitable for execution on the one or more first processors, instruct the one or more first processing cores to execute the microcode pointed to by the first pointer.

15. The system of claim 9, wherein each of the plurality of tasks further include a third pointer to an intermediate language representation that includes dependency information that becomes executable after an occurrence of a predetermined event.

16. A non-transitory computer-readable medium having instructions recorded thereon that, if executed by a computing device, cause the computing device to perform a method comprising:

storing a plurality of tasks in a shared queue that is communicatively connected to one or more first processors of a first type and one or more second processors of a second type, wherein each of the plurality of tasks include a first pointer to microcode for execution on the one or more first processors and a second pointer to compiled code for execution on the one or more second processors, wherein each of the one or more first processors include:
a first dequeuing module, and
one or more first processing cores;

wherein each of the one or more second processors include:
a synchronization module,
a second dequeuing module, and
one or more second processing cores;

synchronizing, by at least one synchronization module, access to the shared queue by the first dequeuing module of each of the one or more first processors and the second dequeuing module of each of the one or more second processors;

reading, by at least one second dequeuing module of the one or more second processors, a particular task from among the plurality of tasks;

dequeuing, by the at least one second dequeuing module of the one or more second processors, the particular task from the shared queue on a condition that the particular task is suitable for execution on the one or more second processors;

instructing, by the at least one second dequeuing module of the one or more second processors, the one or more second processing cores to execute the compiled code pointed to by the second pointer, wherein the second pointer is a pointer of the particular task.

17. The non-transitory computer-readable medium of claim 16, wherein the one or more second processors include a central processing unit (CPU) and the one or more first processors include an accelerated processing device (APD).

18. The non-transitory computer-readable medium of claim 16, wherein the first dequeuing modules of the one or more first processors are hardware devices.

19. The non-transitory computer-readable medium of claim 16, further comprising:

reading, by at least one first dequeing module of the one or more first processors, another particular task from among the plurality of tasking, dequeuing, by the at least one first dequeing modules, the another particular task from the shared queue on a condition that the another particular task is suitable for execution on the one or more first processors, instructing, by the at least one first dequeing modules, the one or more first processing cores to execute the microcode pointed to by the first pointer.

20. The non-transitory computer-readable medium of claim 16, wherein each of the plurality of tasks further include a third pointer to an intermediate language representation that includes dependency information that becomes executable after an occurrence of a predetermined event.

21. A system for balancing a workload on heterogeneous processing devices, the system comprising:

one or more first processors of a first type;
one or more second processors of a second type; and
a shared queue communicatively coupled to the one or more first processors and the one or more second processors;

wherein each of the one or more first processors include:
a first dequeuing module, and
one or more first processing cores;

wherein each of the one or more second processors include:
a synchronization module,
a second dequeuing module, and
one or more second processing cores;

wherein the shared queue stores a plurality of tasks, wherein each of the plurality of tasks include a first pointer to microcode for execution on the one or more first processors and a second pointer to compiled code for execution on the one or more second processors;

wherein each synchronization module of the one or more second processors synchronize access to the shared queue by the first dequeuing module of each of the one or more first processors and the second dequeuing module of each of the one or more second processors, utilizing an atomic operation for synchronization prior to removing a particular task from the shared queue, and wherein each first dequeuing module of the one or more first processors:

read the particular task from among the plurality of tasks, dequeues the particular task from the shared queue on a condition that the particular task is suitable for execution on the one or more first processors, instruct the one or more first processing cores to execute the microcode pointed to by the first pointer, wherein the first pointer is a pointer of the particular task.

22. The system of claim 21, wherein each of the plurality of tasks further include a third pointer to an intermediate language representation that includes dependency information that becomes executable after an occurrence of a predetermined event.

* * * * *